(No Model.)
J. MOORE.
MACHINE FOR MAKING PLUMBERS' AND GAS FITTERS' HOOKS.
No. 412,282.          Patented Oct. 8, 1889.
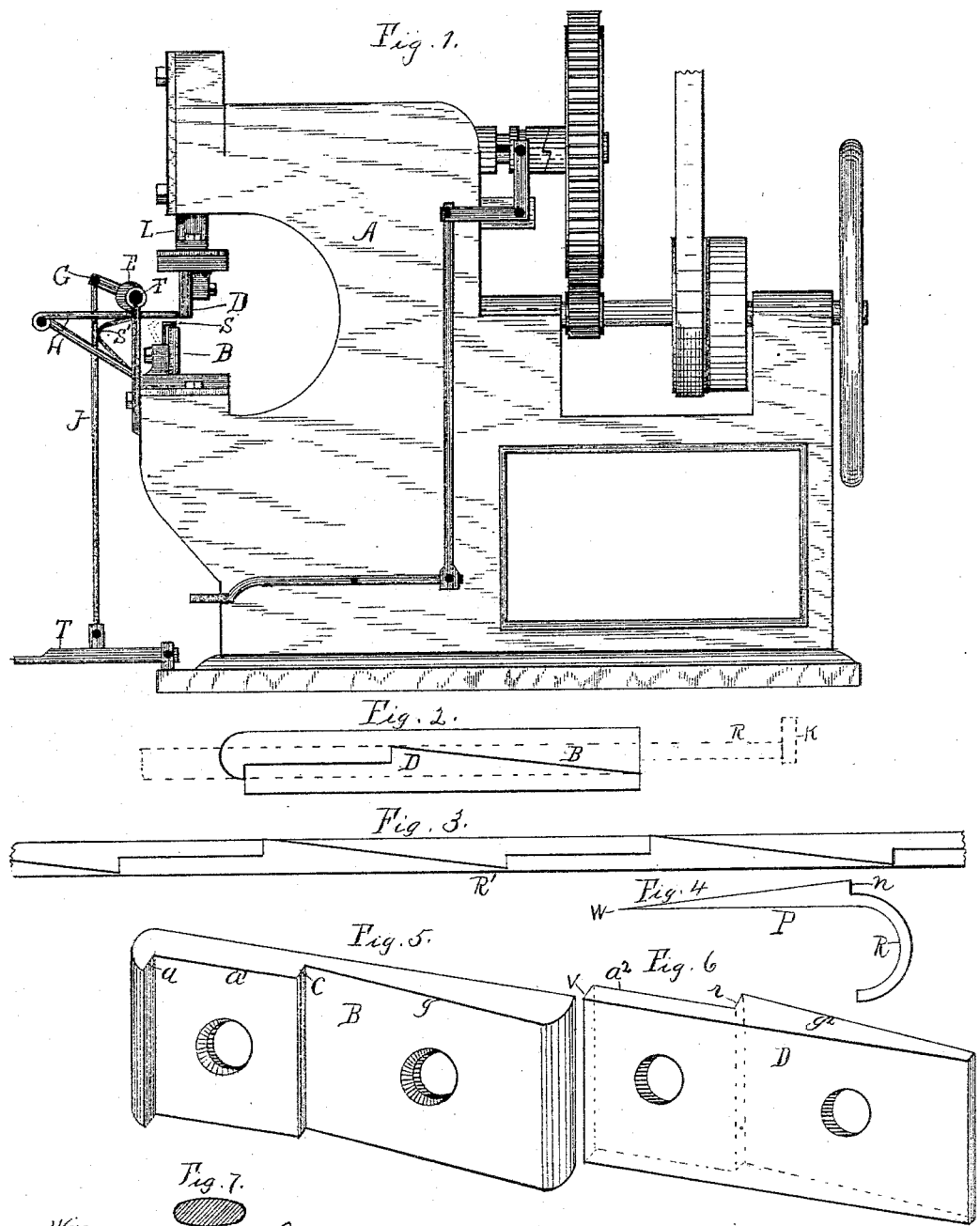

UNITED STATES PATENT OFFICE.

JOSHUA MOORE, OF MARSEILLES, ILLINOIS.

MACHINE FOR MAKING PLUMBERS' AND GAS-FITTERS' HOOKS.

SPECIFICATION forming part of Letters Patent No. 412,282, dated October 8, 1889.

Application filed July 22, 1889. Serial No. 318,204. (No model.)

*To all whom it may concern:*

Be it known that I, JOSHUA MOORE, a citizen of the United States of America, residing at Marseilles, in the county of La Salle and State of Illinois, have invented certain new and useful Improvements in Machines for Making Plumbers' and Gas-Fitters' Hooks, of which the following is a specification, reference being had therein to the accompanying drawings, and the letters and figures of reference thereon, forming a part of this specification, in which—

Figure 1 is a side elevation of a shearing-machine having a pair of the shears for cutting gas-hooks applied thereto. Fig. 2 is a top plan view of the two shears detached from the machine and in the position they would be after making a full stroke, the broken lines showing the relative position of the metal strip from which the hooks are cut at the time they are being cut. Fig. 3 is a view of the metal rod or strip from which the hooks are cut, the lines showing the manner in which it is cut to form the hook-blanks. Fig. 4 is a side view of one of the finished gas-hooks, the hook end being formed after the blank is cut. Fig. 5 is a perspective view of the lower stationary shear. Fig. 6 is a perspective view of the upper movable shear, and Fig. 7 is an exaggerated cross-section of the metal strip or rod designed to be cut up into hook-blanks.

The principal new features in this invention consist in the cutting-shears for cutting the hook-blanks, which shears may be applied to any suitable machine adapted to be used for shearing metal; and they also consist in some attachments to the machine designed to be operated with the shears for holding the work in proper position for the cut to be made.

Referring to the drawings, B and D represent the new cutting-shears. The upper shear D is secured in the ordinary manner to the vertically-reciprocating slide L of the machine A, and the lower shear B is secured to the machine A below shear D and in such position as to shear therewith. The lower shear has four cutting-edges $a$, $a'$, $c$, and $g$, which respectively shear with the cutting-edges $v$, $a^2$, $r$, and $g^2$ of the upper shear, as shown in Fig. 2. The metal rod or strip R', being placed between the shears, as indicated by the broken lines in Fig. 2, will be cut into hook-blanks such as are shown by the lines in Fig. 3, two hook-blanks being cut and dropped at each cut of the shears.

In order to hold the rod R' in place on the lower shear until it is engaged by the upper shear, a spring-clamp H is used. The extending end of this clamp is brought to bear upon the rod by means of the cam E on shaft F, being rotated to engage its upper side through the medium of crank G, connecting-rod J, and treadle T. As soon as the cut is made the clamp is released from the work, and the cut hook-blank is free to be removed from between the shears.

A small spring S is arranged to have its upper part extend over the lower shear B for the purpose of forcibly removing the cut blank. Before the cut is made the rod to be cut holds said spring back, as shown in the broken lines in Fig. 1, and after the cut is made and the cut blank is free said spring will force it out from between the shears. In operation, before the rod R' is cut into the hook-blanks a part is cut out of one end, so as to leave the extending part R forming the hook. When the rod is placed between the shears, the said part R is run out beyond the shears against a gage K, as shown in Fig. 2 in broken lines, so that each time a cut is made two hook-blanks are cut and dropped. The cutting-edges $c$ $r$ and $a$ $v$ cut and form the shoulder $n$, (see Fig. 4,) and the cutting-edges $g$ $g'$ cut the diagonal line to form the points W. The hook R is bent and formed afterward by a separate machine.

The number of cutting-edges corresponding with those shown may be multiplied, so as to cut more than two hook-blanks at a time, if desired.

No description of the machine is made, as it forms no part of this invention.

Having thus described my invention, what I claim as new, and desire to secure by Letters Patent, is as follows, to wit:

1. In the shearing-machine shown and described, the combination of the shears B and D, each having the cutting-edges specified, the clamp H, and spring S, substantially as and for the purpose set forth.

2. In the shearing-machine shown and described, the combination of the shears B and D, each having the cutting-edges specified, the spring S, spring-clamp H, shaft F, having the cam E and arm G, rod J, and treadle T, substantially as and for the purpose set forth.

3. In a shearing-machine, the combination of the shear B, having the cutting-edges $a\ a'\ c\ g$, and the shear D, having the cutting-edges $v$, $a^2$, $r$, and $g^2$, substantially as and for the purpose set forth.

4. The combination of the shears B and D, each having cutting-edges for conjointly cutting gas-hook blanks formed to have the point W, shoulder $n$, and extending end R, for forming a hook, substantially as and for the purpose set forth.

5. The combination of the shears B and D, having respectively the cutting-edges for forming the shoulder $n$ of the hook-blanks, substantially as and for the purpose set forth.

JOSHUA MOORE.

Witnesses:
THOS. H. HUTCHINS,
J. F. ROBBINS.